(12) United States Patent
Tsukuda (10) Patent No.: US 11,136,897 B2
(45) Date of Patent: Oct. 5, 2021

(54) SEAL DEVICE AND TURBOMACHINE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventor: Tomohiko Tsukuda, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 151 days.

(21) Appl. No.: 16/530,291

(22) Filed: Aug. 2, 2019

(65) Prior Publication Data

US 2020/0040752 A1 Feb. 6, 2020

(30) Foreign Application Priority Data

Aug. 3, 2018 (JP) .............................. JP2018-147131

(51) Int. Cl.
*F01D 11/02* (2006.01)
*F01D 11/00* (2006.01)

(52) U.S. Cl.
CPC ........ *F01D 11/005* (2013.01); *F05D 2240/55* (2013.01)

(58) Field of Classification Search
CPC ........ F01D 11/02; F01D 11/001; F01D 11/08; F16J 15/4472; F16J 15/44; F02C 7/28
See application file for complete search history.

(56) References Cited

U.S. PATENT DOCUMENTS

| 4,370,094 | A | * | 1/1983 | Ambrosch | F01D 11/08 415/119 |
| 4,420,161 | A | * | 12/1983 | Miller | F01D 25/04 277/418 |
| 5,735,667 | A | * | 4/1998 | Sanders | F01D 11/02 415/170.1 |
| 7,600,965 | B2 | * | 10/2009 | Seitz | F01D 11/08 415/144 |
| 8,434,766 | B2 | * | 5/2013 | Zeng | F01D 11/02 277/419 |
| 9,234,434 | B2 | * | 1/2016 | Stefanis | F01D 11/02 |

(Continued)

FOREIGN PATENT DOCUMENTS

JP S58-222902 A 12/1983

*Primary Examiner* — Eldon T Brockman
(74) *Attorney, Agent, or Firm* — Finnegan, Henderson, Farabow, Garrett & Dunner L.L.P.

(57) ABSTRACT

A seal device according to the embodiment includes a seal fin provided between the rotation body and the stationary body and extending in a circumferential direction of the rotation body, and a swirl brake fin provided on the stationary body upstream of the seal fin. The swirl brake fin reduces a circumferential velocity component of the working fluid. The swirl brake fin has a negative pressure surface provided on a side of a rotation direction of the rotation body and a positive pressure surface provided on an opposite side to the negative pressure surface. The positive pressure surface extends in a direction opposite to the rotation direction of the rotation body from radially outward toward radially inward.

9 Claims, 6 Drawing Sheets

(56) References Cited

U.S. PATENT DOCUMENTS

| | | | | |
|---|---|---|---|---|
| 2007/0196204 A1* | 8/2007 | Seitz | .................... | F04D 29/685 |
| | | | | 415/144 |
| 2009/0160135 A1* | 6/2009 | Turini | .................. | F16J 15/4472 |
| | | | | 277/418 |
| 2012/0043728 A1* | 2/2012 | Zeng | .................... | F16J 15/4472 |
| | | | | 277/412 |
| 2015/0001812 A1* | 1/2015 | Stefanis | .................. | F16J 15/44 |
| | | | | 277/412 |

* cited by examiner

SEAL DEVICE AND TURBOMACHINE

CROSS-REFERENCE TO RELATED APPLICATIONS

This application is based upon and claims the benefit of priority from Japanese Patent Application No. 2018-147131, filed Aug. 3, 2018; the entire contents of which are incorporated herein by reference.

FIELD

Embodiments of the present invention relate to a seal device and a turbomachine.

BACKGROUND

Turbomachines such as axial flow turbines (for example, steam turbines, gas turbines) and compressors include a rotor and a casing provided around the rotor. A moving blade is provided on the outer circumferential surface of the rotor, and constitutes a rotation body together with the rotor. A stator blade is provided on the inner circumferential surface of the casing and constitutes a stationary body together with the casing.

The casing is configured to seal the working fluid. However, a radial gap is provided between the stationary body and the rotation body to avoid contact therebetween. Such a gap is provided, for example, between the moving blade and the casing, between the stator blade and the rotor, and between the rotor and the casing. A seal device that reduces the flow rate of the working fluid passing therethrough is provided in the gap. Thereby, the leak flow of the working fluid is suppressed, and the efficiency reduction of the axial flow turbine is suppressed. In an axial flow turbine installed in a large power plant and the like, it is common to use a labyrinth seal device as a seal device.

The working fluid flowing into the seal device may have a circumferential velocity component. If the rotor is displaced radially with the working fluid having a circumferential velocity component, the pressure of the working fluid may become unbalanced in the circumferential direction in the seal device. This will be described with reference to FIG. 8.

Figure 8:
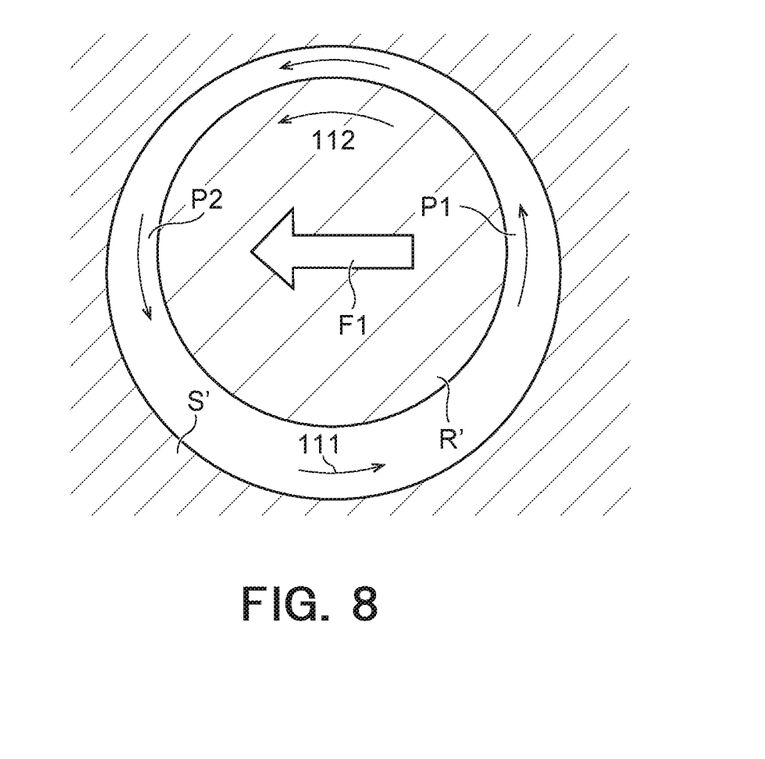
FIG. 8 is a schematic cross-sectional view of a rotation body and a stationary body as viewed from the axial direction.

In FIG. 8, in order to simplify the drawing, a rotation body R' and a stationary body S' provided around the rotation body R' are shown. As shown in FIG. 8, a high pressure region P1 and a low pressure region P2 are formed in the circumferential direction of the rotation body R' displaced in the radial direction. That is, the high pressure region P1 is formed in a region where the working fluid flows into a portion where the gap between the rotation body R' and the stationary body S' is narrow, and the low pressure region P2 is formed in a region from which the working fluid flows from the narrow portion. Due to the pressure difference, fluid force F1 (hereinafter referred to as unstable fluid force) that destabilizes the rotation body R' may be generated. This unstable fluid force can cause an unstable vibration in the rotation body. In particular, when the rotor, which is a rotation body, rotates at high speed, or when the difference between the pressure of the working fluid at the inlet of the seal device provided between the rotation body and the stationary body and the pressure of the working fluid at the outlet is large, this unstable fluid force becomes large.

In order to reduce such unstable fluid force, techniques have been proposed in which swirl brake fins are provided at the inlet of the seal device to suppress swirling of the working fluid due to the circumferential velocity component. This will be described more specifically.

Figure 9:
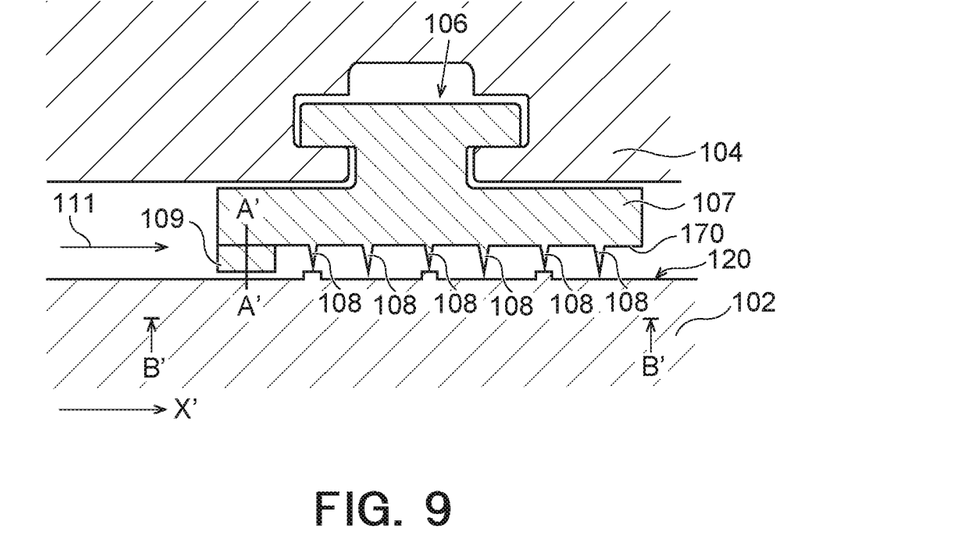
FIG. 9 is a cross-sectional view of the meridian plane showing the structure of a general seal device.
Figure 10:
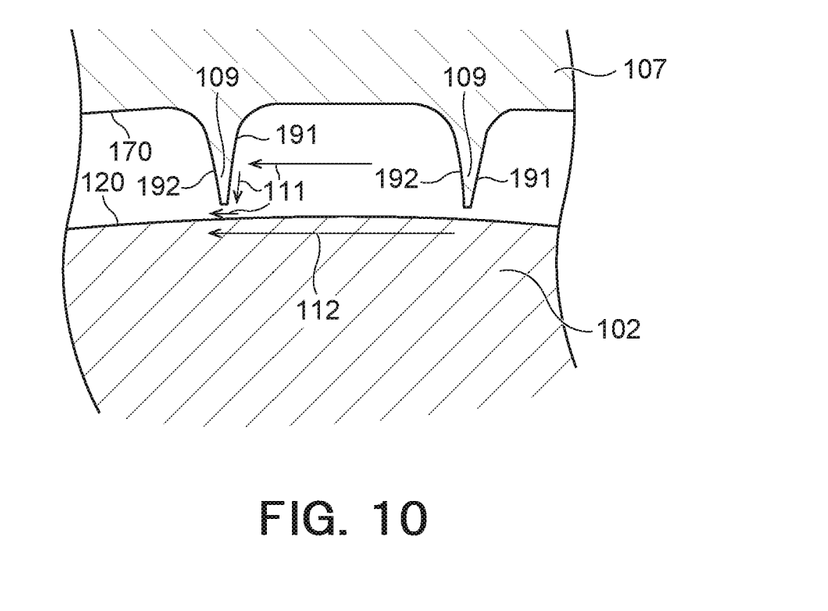
FIG. 10 is a cross-sectional view taken along the line A'-A' of FIG. 9.
Figure 11:
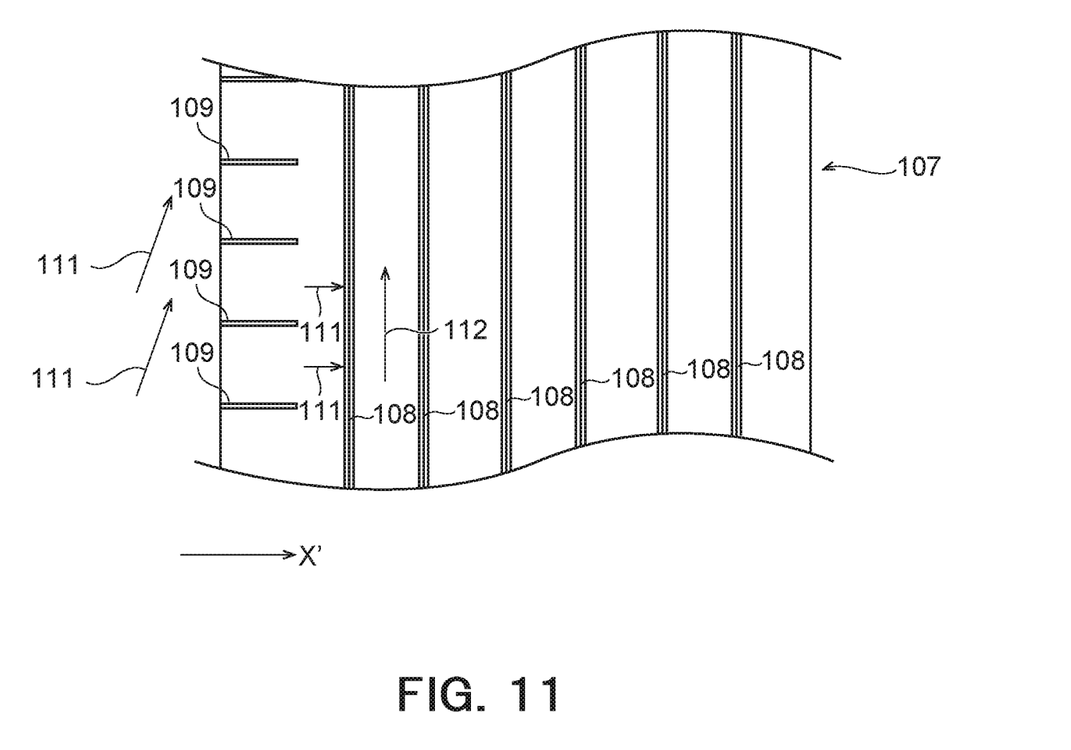
FIG. 11 is an arrow view taken from the direction B' in FIG. 9.

Here, a general seal device in an axial flow turbine will be described with reference to FIGS. 9 to 11. As shown in FIG. 9, a seal device 106 is disposed between a rotor 102 and a casing 104 provided around the rotor 102. The seal device 106 has a packing ring 107 held by the casing 104.

The inner circumferential surface 170 of the packing ring 107 is provided with a seal fin 108 to reduce the flow rate of the working fluid passing through the gap between the rotor 102 and the packing ring 107. The plurality of seal fins 108 is arranged side by side in the axial direction X' of the rotor 102. The seal fin 108 projects from the inner circumferential surface 170 of the packing ring 107 toward the outer circumferential surface 120 of the rotor 102.

The inner circumferential surface 170 of the packing ring 107 at the inlet of the seal device 106 is provided with a swirl brake fin 109 to reduce the circumferential velocity component of the working fluid. As shown in FIG. 11, the plurality of swirl brake fins 109 is arranged side by side in the circumferential direction of the rotor 102. As shown in FIG. 10, the swirl brake fin 109 projects from the inner circumferential surface 170 of the packing ring 107 toward the outer circumferential surface 120 of the rotor 102. The swirl brake fin 109 has a negative pressure surface 192 provided on a side of the rotation direction 112 of the rotor 102 and a positive pressure surface 191 provided on an opposite side to the negative pressure surface 192.

The working fluid flowing into the seal device 106 may have a circumferential velocity component in the same direction as the rotation direction 112 of the rotor 102 due to rotational friction of the rotor 102 or the like. As a result, the working fluid flows in the direction of the arrow indicated by reference sign 111 and collides with the positive pressure surface 191 of the swirl brake fin 109. The working fluid, as shown in FIG. 11, is diverted in the direction along the axial direction X' of the rotor 102 and flows out of the region where the swirl brake fin 109 is provided, and flows into the region where the seal fin 108 is provided. In this manner, the swirl brake fin 109 is adapted to reduce the circumferential velocity component of the working fluid.

However, in the seal device 106 described above, a minute gap is provided between the swirl brake fin 109 and the outer circumferential surface 120 of the rotor 102. For this reason, the working fluid flowing in the vicinity of the outer circumferential surface 120 of the rotor 102 passes through this minute gap without colliding with the swirl brake fin 109, and flows into the region where the seal fin 108 is provided with the circumferential velocity component.

In addition, when the working fluid collides with the positive pressure surface 191 of the swirl brake fin 109, the pressure on the positive pressure surface 191 is increased. For this reason, the pressure difference between the positive pressure surface 191 and the negative pressure surface 192 increases, and the flow rate of the working fluid flowing from the positive pressure surface 191 to the negative pressure surface 192 may increase by passing through a minute gap between the swirl brake fin 109 and the outer circumferential surface 120 of the rotor 102. The working fluid thus flowing also has a circumferential velocity component.

Thus, the working fluid having passed through the minute gap is accelerated again in the same direction as the rotation direction 112 of the rotor 102 by the rotational friction of the rotor 102, so that the circumferential velocity component may increase. For this reason, in the seal device 106 mentioned above, the effect of the swirl brake fin 109 of reducing the circumferential velocity component of the working fluid may not be able to be sufficiently exhibited.

DETAILED DESCRIPTION

A seal device according to the embodiment that reduces a flow rate of a working fluid leaking from a gap between a rotation body of a turbomachine and a stationary body provided around the rotation body includes a seal fin provided between the rotation body and the stationary body and extending in a circumferential direction of the rotation body, and a swirl brake fin provided on the stationary body upstream of the seal fin, where the swirl brake fin reduces a circumferential velocity component of the working fluid. The swirl brake fin has a negative pressure surface provided on a side of a rotation direction of the rotation body and a positive pressure surface provided on an opposite side to the negative pressure surface. The positive pressure surface extends in a direction opposite to the rotation direction of the rotation body from radially outward toward radially inward.

A turbomachine according to an embodiment includes a rotation body, a stationary body, and the above-described seal device.

Hereinafter, an embodiment of the present disclosure will be described with reference to the drawings.

First Embodiment

A seal device and a turbomachine according to a first embodiment will be described with reference to FIGS. 1 to 4. Specific examples of the turbomachine to which the seal device according to the present embodiment is applicable include axial flow turbines such as steam turbines and gas turbines, and compressors. In the present embodiment, an axial flow turbine will be described below as an example of a turbomachine.

Figure 1:
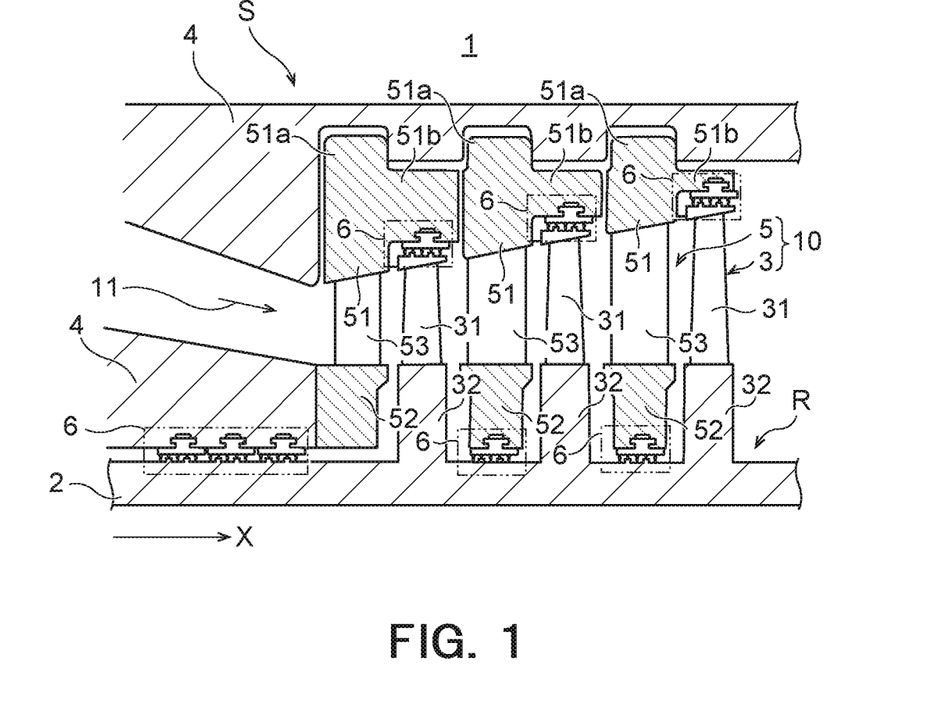
FIG. 1 is a cross-sectional view of the meridian plane of part of an axial flow turbine according to a first embodiment.

As shown in FIG. 1, an axial flow turbine 1 includes a rotor 2 and a casing 4 provided around the rotor 2. The rotor 2 is configured to be rotatable about a rotation axis disposed along the axial direction X.

The rotor 2 is provided with a plurality of moving blade cascades 3. The rotor 2 and the moving blade cascade 3 are configured as a rotation body R. On the other hand, the casing 4 is provided with a plurality of stator blade cascades 5. The casing 4 and the stator blade cascade 5 are configured as a stationary body S. The stator blade cascades 5 and the moving blade cascades 3 are alternately arranged in the axial direction X of the rotor 2. One stator blade cascade 5 and one moving blade cascade 3 which are adjacently disposed downstream (right side in FIG. 1) of the one stator blade cascade 5 constitute one turbine stage 10. The axial flow turbine 1 is provided with a plurality of such turbine stages 10 in the axial direction X of the rotor 2.

The stator blade cascade 5 includes a stator blade outer ring 51 supported by the casing 4, a stator blade inner ring 52 provided radially inward of the stator blade outer ring 51, and a plurality of stator blades 53 disposed between the stator blade outer ring 51 and the stator blade inner ring 52. The stator blades 53 are arranged in the circumferential direction. The stator blade outer ring 51 includes an outer ring main body 51a and an outer ring projection portion 51b that projects downstream of the outer ring main body 51a. The outer ring main body 51a is disposed to face the stator blade 53, and the outer ring projection portion 51b is disposed to face a moving blade 31 to be described later.

The moving blade cascade 3 has a plurality of moving blades 31 arranged in the circumferential direction. Each moving blade 31 is planted on the rotor 2. More specifically, the rotor 2 includes a plurality of rotor disks 32 projecting radially outward of the outer circumferential surface 20 thereof. The plurality of rotor disks 32 is provided in the axial direction X, and the moving blades 31 are fixed to the respective rotor disk 32. The moving blade 31 is disposed such that the outer circumferential surface 20 thereof faces the inner circumferential surface of the outer ring projection portion 51b of the stator blade outer ring 51. Further, the stator blade inner ring 52 is disposed such that the inner circumferential surface thereof faces the outer circumferential surface 20 of the rotor 2 in a region where the rotor disks 32 are not provided.

A supply pipe (not shown) is connected to the casing 4 so that working fluid such as steam and combustion gas is supplied to the axial flow turbine 1. The working fluid supplied from the supply pipe to the axial flow turbine 1 flows as indicated by an arrow represented by reference sign 11 and alternately passes through the stator blade cascade 5 and the moving blade cascade 3 of each turbine stage 10, and performs work on the moving blade 31. As a result, fluid energy of the working fluid is converted into rotational energy for rotation driving the rotor 2. The rotor 2 is connected to a generator (not shown) so that rotational energy (or rotational torque) can be transmitted to the generator. The generator is configured to generate power by its rotational energy. The working fluid having passed through each turbine stage 10 is discharged through an exhaust flow path (not shown).

In order to avoid contact between the rotation body R composed of the rotor 2 and the moving blade cascade 3 and the stationary body S composed of the casing 4 and the stator blade cascade 5 during an operation of the axial flow turbine 1, a gap is provided between the rotation body R and the stationary body S. More specifically, gaps are provided between the outer circumferential surface 20 of the rotor 2 and the inner circumferential surface of the casing 4, between the outer circumferential surface 20 of the moving blade 31 and the inner circumferential surface of the outer ring projection portion 51b, and between the outer circumferential surface 20 of the rotor 2 and the inner circumferential surface of the stator blade inner ring 52.

If the flow rate of the working fluid leaking from these gaps increases, the performance of the axial flow turbine 1 may be degraded. Therefore, a seal device 6 that reduces the flow rate of the leaking working fluid is provided in these gaps formed between the rotation body R and the stationary body S. The seal device 6 provided between the outer circumferential surface 20 of the rotor 2 and the inner circumferential surface of the casing 4 will be described below as an example.

Figure 2:
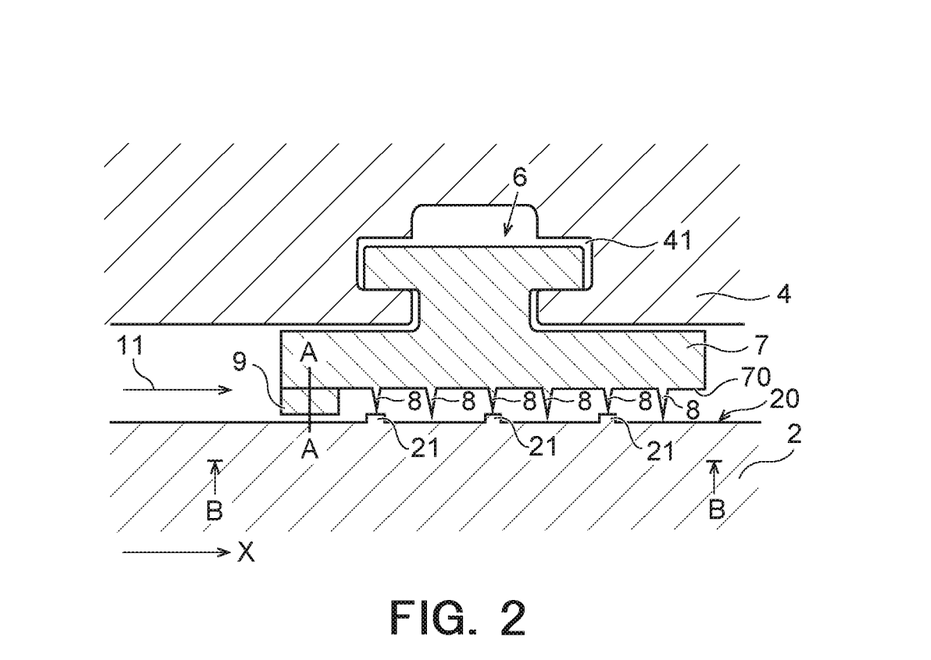
FIG. 2 is a cross-sectional view of the meridian plane showing the structure of a seal device according to the first embodiment.

As shown in FIG. 2, the seal device 6 is disposed between the rotor 2 of the axial flow turbine 1 and the casing 4 provided around the rotor 2. The seal device 6 has a packing ring 7 held by the casing 4. The packing ring 7 is formed to extend in the circumferential direction of the rotor 2. The packing ring 7 is fitted and held in a groove 41 provided in the casing 4. The packing ring 7 may be constituted by a plurality of segment members divided in the circumferential direction of the rotor 2.

Figure 4:
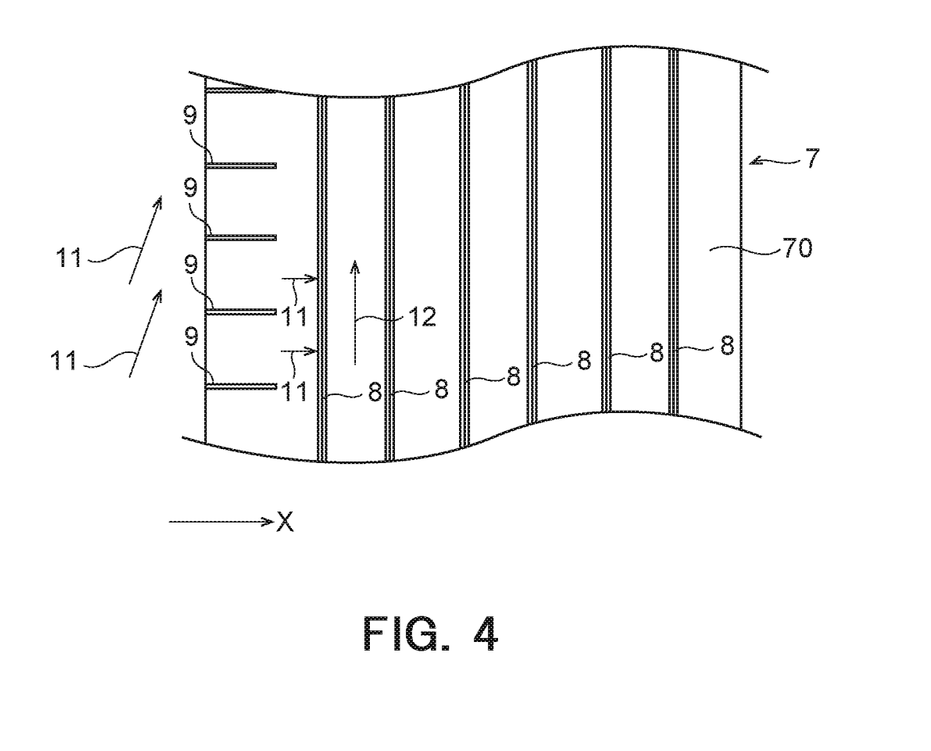
FIG. 4 is an arrow view taken from the direction B in FIG. 2.

A seal fin 8 is provided between the rotor 2 and the casing 4. In the present embodiment, the seal fin 8 is provided on the casing 4 via the packing ring 7, and the plurality of seal fins 8 is provided on the inner circumferential surface 70 of the packing ring 7. The plurality of seal fins 8 is arranged side by side in the axial direction X of the rotor 2. Further, as shown in FIG. 4, the seal fin 8 extends in the circumferential direction of the rotor 2. The seal fin 8 projects from the inner circumferential surface 70 of the packing ring 7 toward the outer circumferential surface 20 of the rotor 2. When viewed in the cross section shown in FIG. 2, the seal fin 8 has a substantially triangular shape that tapers from the inner circumferential surface 70 of the packing ring 7 toward the outer circumferential surface 20 of the rotor 2. In order to avoid contact between the seal fin 8 and the rotor 2, a minute gap is provided between the tip of the seal fin 8 and the outer circumferential surface 20 of the rotor 2.

The seal device 6 shown in FIG. 2 is a Hi-Lo type labyrinth seal device. That is, as shown in FIG. 2, the seal fin 8 having a relatively small height in the radial direction of the rotor 2, and the seal fin 8 having a relatively large height are alternately arranged in the axial direction X of the rotor 2. The diameter of the rotor 2 is large at a position facing the seal fin 8 having a relatively small height, and is small at a position facing the seal fin 8 having a relatively large height. In other words, the outer circumferential surface 20 of the rotor 2 is provided with a projection portion 21 facing the seal fin 8 having a relatively small height.

The working fluid having flowed into the seal device 6 sequentially passes through a relatively small passing area and a relatively large passing area by the seal fin 8 configured as described above. As a result, the working fluid is expanded by sequentially repeating acceleration and deceleration of the working fluid, thereby increasing the fluid resistance and reducing the leak flow rate. Such a seal fin 8 can reduce the flow rate of the working fluid passing through the gap between the rotor 2 and the packing ring 7.

The seal fin 8 may be cut and formed integrally with the packing ring 7 or may be manufactured separately from the packing ring 7 and attached to the packing ring 7. Also, the seal fin 8 may be formed integrally or separately with the casing 4 or the rotor 2. When the seal device 6 is provided between the stator blade outer ring 51 and the moving blade 31, the seal fin 8 may be formed integrally with or separately from the stator blade outer ring 51 or the moving blade 31, and when the seal device 6 is provided between the stator blade inner ring 52 and the rotor 2, the seal fin 8 may be formed integrally with or separately from the stator blade inner ring 52 or the rotor 2.

Furthermore, a swirl brake fin 9 that reduces the circumferential velocity component of the working fluid is provided on the casing 4 via the packing ring 7. In the present embodiment, the swirl brake fin 9 is provided on the inner circumferential surface 70 of the packing ring 7 held by the casing 4. The swirl brake fin 9 is provided upstream of the seal fin 8 (that is, at the inlet of the seal device 6). As shown in FIG. 4, the plurality of swirl brake fin 9 is arranged in the circumferential direction of the rotor 2. Further, the swirl brake fin 9 extends in the axial direction X of the rotor 2. The swirl brake fin 9 projects from radially outward toward radially inward (that is, from the inner circumferential surface 70 of the packing ring 7 toward the outer circumferential surface 20 of the rotor 2). When viewed in the cross section shown in FIG. 3, the swirl brake fin 9 has a substantially triangular shape that tapers from the inner circumferential surface 70 of the packing ring 7 to the outer circumferential surface 20 of the rotor 2. A minute gap is provided between the tip of the swirl brake fin 9 and the outer circumferential surface 20 of the rotor 2 in order to avoid contact between the swirl brake fin 9 and the rotor 2. Further, the swirl brake fin 9 has a negative pressure surface 92 provided on a side of the direction (rotation direction 12) in which the rotor 2 rotates and a positive pressure surface 91 provided on an opposite side to the negative pressure surface 92.

Figure 3:
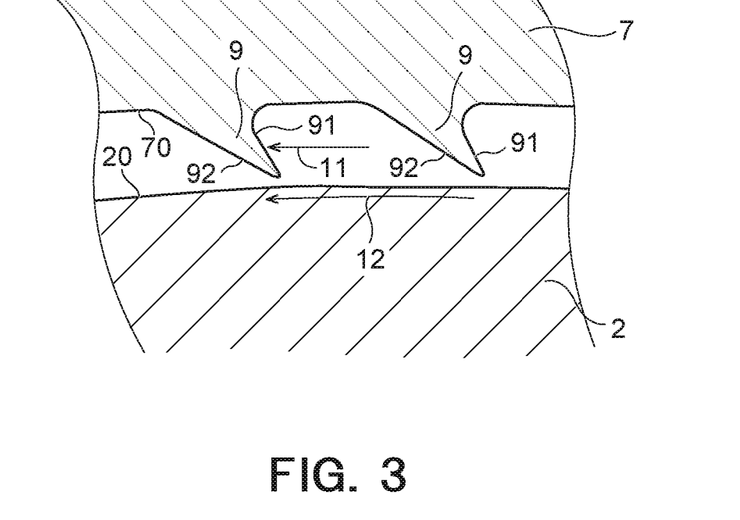
FIG. 3 is a cross-sectional view taken along the line A-A of FIG. 2.

In the present embodiment, the positive pressure surface 91 is formed flat, and when viewed in the cross section shown in FIG. 3, the positive pressure surface 91 is formed to be inclined with respect to the radial direction so that the positive pressure surface 91 extends from the inner circumferential surface 70 of the packing ring 7 toward the outer circumferential surface 20 of the rotor 2, and extends in the direction opposite to the rotation direction 12 of the rotor 2. As in the positive pressure surface 91, the negative pressure surface 92 is also formed flat and inclined with respect to the radial direction. As described above, the swirl brake fins 9 as a whole are formed to extend in the direction opposite to the rotation direction 12 of the rotor 2 from the inner circumferential surface 70 of the packing ring 7 toward the outer circumferential surface 20 of the rotor 2.

In FIG. 3, although the positive pressure surface 91 and the negative pressure surface 92 are formed flat and the swirl brake fin 9 has a substantially triangular shape, the present invention is not limited to this. The positive pressure surface 91 may be formed in a curved shape so as to extend in the direction opposite to the rotation direction 12 of the rotor 2 from the inner circumferential surface 70 of the packing ring 7 toward the outer circumferential surface 20 of the rotor 2. The same applies to the negative pressure surface 92. Furthermore, the negative pressure surface 92 may not extend in the direction opposite to the rotation direction 12 of the rotor 2 from the inner circumferential surface 70 of the packing ring 7 toward the outer circumferential surface 20 of the rotor 2.

In addition, the swirl brake fin 9 may be cut and formed integrally with the packing ring 7 or may be manufactured separately from the packing ring 7 and attached to the packing ring 7. Also, the swirl brake fin 9 may be formed integrally or separately with the casing 4. When the seal device 6 is provided between the stator blade outer ring 51 and the moving blade 31, the swirl brake fin 9 may be formed integrally with or separately from the stator blade outer ring 51, and when the seal device 6 is provided between the stator blade inner ring 52 and the rotor 2, the swirl brake fin 9 may be formed integrally with or separately from the stator blade inner ring 52.

Next, the function of the present embodiment having such a configuration will be described.

When the axial flow turbine 1 according to the present embodiment is operated, working fluid such as steam and combustion gas is supplied to the axial flow turbine 1 from the supply pipe. The working fluid supplied from the supply pipe to the axial flow turbine 1 alternately passes through the stator blade cascade 5 and the moving blade cascade 3 of each turbine stage 10 and performs work on the moving blade 31. As a result, fluid energy possessed by the working fluid is converted into rotational energy that causes the rotor 2 to rotate, and the generator generates electric power by the rotational energy. The working fluid which has passed through each turbine stage 10 is discharged through an exhaust flow path.

On the other hand, part of the working fluid supplied to the axial flow turbine 1 flows into a gap provided between the rotation body R and the stationary body S and passes through the seal device 6. A circumferential velocity component in the same direction as the rotation direction 12 of the rotor 2 is imparted to the working fluid passing through the seal device 6 by rotational friction of the rotor 2 or the like. That is, since the working fluid flowing into the seal device 6 flows in the vicinity of the outer circumferential surface 20 of the rotor 2, it has a circumferential velocity component due to the rotation of the rotor 2.

The working fluid that has flowed into the seal device 6 first collides with the positive pressure surface 91 of the swirl brake fin 9. Here, the positive pressure surface 91 of the swirl brake fin 9 according to the present embodiment extends in the direction opposite to the rotation direction 12 of the rotor 2 from the inner circumferential surface 70 of the packing ring 7 toward the outer circumferential surface 20 of the rotor 2. As a result, the flow of the working fluid that has collided with the positive pressure surface 91 is diverted radially outward of the rotor 2 so as to conform to the shape of the positive pressure surface 91. Therefore, the flow of the working fluid toward the outer circumferential surface 20 of the rotor 2 is suppressed.

In this case, the working fluid is held so as to be blocked by the positive pressure surface 91, and the pressure difference between the positive pressure surface 91 and the negative pressure surface 92 may increase. However, as mentioned above, since the flow of the working fluid toward the outer circumferential surface 20 of the rotor 2 is suppressed, the flow rate of the working fluid passing through the minute gap between the swirl brake fin 9 and the outer circumferential surface 20 of the rotor 2 is reduced.

Also, since the flow is diverted radially outward, a flow that can be wound radially outward is formed in the vicinity of the positive pressure surface 91, and working fluid flowing radially inward of the positive pressure surface 91 is drawn into this flow. This suppresses the working fluid flowing into a minute gap between the swirl brake fin 9 and the outer circumferential surface 20 of rotor 2.

As described above, according to the present embodiment, the positive pressure surface 91 of the swirl brake fin 9 extends in the direction opposite to the rotation direction 12 of the rotor 2 from radially outward toward radially inward. As a result, the flow of the working fluid that has collided with the positive pressure surface 91 can be diverted radially outward of the rotor 2. Therefore, it is possible to reduce the flow rate of the working fluid leaking from the minute gap between the swirl brake fin 9 and the outer circumferential surface 20 of the rotor 2. Thus, the circumferential velocity component of the working fluid flowing in the seal device 6 can be effectively reduced by the swirl brake fin 9. As a result, unstable vibration of the rotor 2 caused by the circumferential velocity component of the working fluid flowing in the seal device 6 can be effectively suppressed.

Further, according to the present embodiment, the swirl brake fin 9 extends in the axial direction X of the rotor 2. As a result, the working fluid that has collided with the positive pressure surface 91 and is diverted radially outward of the rotor 2 can flow along the axial direction X of the rotor 2. Therefore, the circumferential velocity component of the working fluid flowing in the seal device 6 can be effectively reduced by the swirl brake fin 9.

Further, according to the present embodiment, the plurality of swirl brake fins 9 is arranged side by side in the circumferential direction of the rotor 2. As a result, the flow of working fluid can be diverted radially outward of the rotor 2 at a plurality of points in the circumferential direction of the rotor 2, so that the effect of reducing the circumferential velocity component by the swirl brake fin 9 as described above can be further exhibited.

Second Embodiment

Next, a seal device and a turbomachine according to a second embodiment will be described with reference to FIG. 5.

Figure 5:
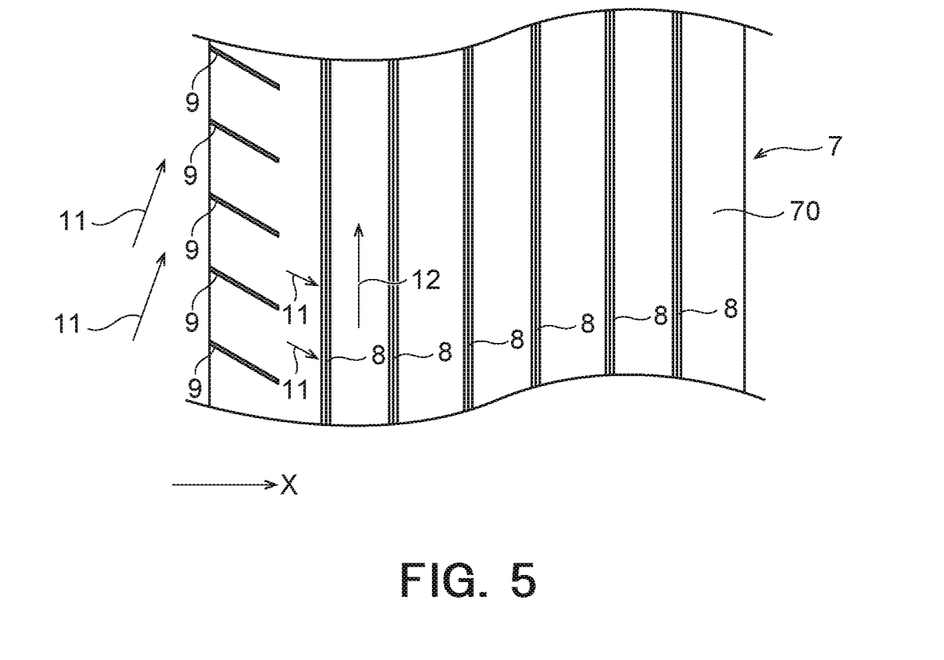
FIG. 5 shows the structure of a seal device according to a second embodiment, and an arrow view taken from the direction B in FIG. 2.

In the second embodiment shown in FIG. 5, the main difference is that the swirl brake fins extend in the direction opposite to the rotation direction of the rotation body from upstream toward downstream, and the other configurations are substantially the same as those of the first embodiment shown in FIGS. 1 to 4. In FIG. 5, the same parts as those of the first embodiment shown in FIGS. 1 to 4 are designated by the same reference numerals and their detailed description will be omitted.

As shown in FIG. 5, the swirl brake fin 9 according to the present embodiment extends in the direction opposite to the rotation direction 12 of the rotor 2 from upstream toward downstream. That is, the swirl brake fin 9 is formed to be inclined with respect to the axial direction X so as to extend in the direction opposite to the rotation direction 12 of the rotor 2 while extending from upstream toward downstream. Although the swirl brake fin 9 shown in FIG. 5 is formed in linear shape when viewed radially outward (from the B direction shown in FIG. 2), the present invention is not limited to this. For example, the swirl brake fin 9 may be formed in a curved shape as long as it extends in the direction opposite to the rotation direction 12 of the rotor 2 from upstream toward downstream.

In the present embodiment shown in FIG. 5, during the operation of the axial flow turbine 1, the direction 11 of the flow of the working fluid held so as to be blocked by the positive pressure surface 91 of the swirl brake fin 9 is directed opposite to the rotation direction 12 of the rotor 2. As a result, the circumferential velocity component in the direction opposite to the rotation direction 12 of the rotor 2 is imparted to the working fluid, and in this state, it flows out of the region provided with the swirl brake fin 9.

Thereafter, the working fluid can be accelerated in the same direction as the rotation direction 12 of the rotor 2 by rotational friction with the rotor 2 while flowing in the region provided with the seal fin 8. However, the working fluid flows into the region provided with the seal fin 8 while having the circumferential velocity component in the direction opposite to the rotation direction 12. For this reason, the increase in the circumferential velocity component in the same direction as the rotation direction 12 is suppressed. As a result, the working fluid has the further reduced circumferential velocity component, compared with a case of flowing out from the region provided with the swirl brake fin 9 in the state where there is no circumferential velocity component (the circumferential velocity component is 0 (zero)).

Here, when the swirl brake fin 9 is formed so as to extend in the direction opposite to the rotation direction 12 of the rotor 2 from upstream toward downstream, the degree of diversion (diversion angle) of the working fluid increases, and the pressure on the positive pressure surface 91 of the swirl brake fin 9 may increase. For this reason, the pressure difference between the positive pressure surface 91 and the negative pressure surface 92 is increased, so that the flow rate of the working fluid leaking through the minute gap between the swirl brake fin 9 and the outer circumferential surface 20 of the rotor 2 can be increased.

However, as in the first embodiment, the positive pressure surface 91 of the swirl brake fin 9 extends in the direction opposite to the rotation direction 12 of the rotor 2 from the inner circumferential surface 70 of the packing ring 7 toward the outer circumferential surface 20 of the rotor 2. As a result, it is possible to minimize the increase in the flow rate of the working fluid passing through the minute gap between the swirl brake fin 9 and the outer circumferential surface 20 of the rotor 2.

As described above, according to the present embodiment, the swirl brake fin 9 extends in the direction inclined opposite to the rotation direction 12 of the rotor 2 from upstream toward downstream. As a result, the working fluid that collides with the positive pressure surface 91 and is diverted radially outward of the rotor 2 can flow in the direction opposite to the rotation direction 12 of the rotor 2. Therefore, the circumferential velocity component of the working fluid flowing in the seal device 6 can be further reduced. As a result, unstable vibration of the rotor 2 caused by the circumferential velocity component of the working fluid flowing in the seal device 6 can be effectively suppressed.

Third Embodiment

Next, a seal device and a turbomachine according to a third embodiment will be described with reference to FIG. 6.

Figure 6:
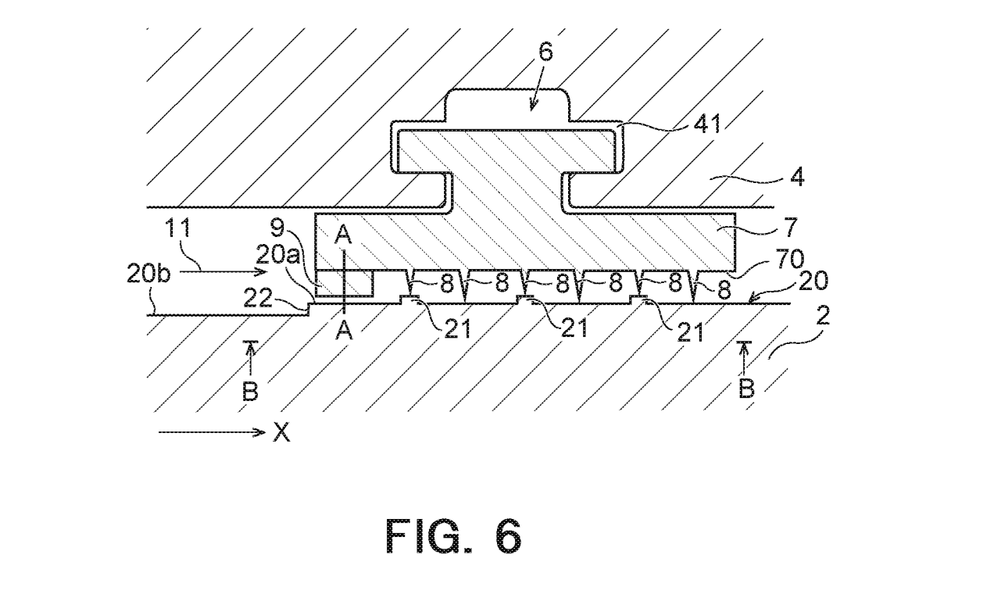
FIG. 6 is a cross-sectional view of the meridian plane showing the structure of a seal device according to a third embodiment.

In the third embodiment shown in FIG. 6, the main difference is that the first facing surface facing the swirl brake fin has a diameter greater than the diameter of the upstream side surface provided upstream thereof, and the first facing surface and the upstream side surface are connected by the first step wall, and the other configurations are substantially the same as those of the first embodiment shown in FIGS. 1 to 4. In FIG. 6, the same parts as those of the first embodiment shown in FIGS. 1 to 4 are designated by the same reference numerals and their detailed description will be omitted.

As shown in FIG. 6, the seal device 6 according to the present embodiment further has a first facing surface 20*a* provided on the outer circumferential surface 20 of the rotor 2 and facing the swirl brake fin 9, and an upstream side surface 20*b* provided on the outer circumferential surface 20 of the rotor 2 upstream of the first facing surface 20*a*. The first facing surface 20*a* has a diameter larger than a diameter of the upstream side surface 20*b*. A first step wall 22 is provided upstream of the first facing surface 20*a*. In the example shown in FIG. 6, the first step wall 22 is disposed upstream of the upstream end (left end in FIG. 6) of the swirl brake fin 9. The first facing surface 20*a* and the upstream side surface 20*b* are connected by the first step wall 22. In addition, the projection portion 21 described in FIG. 2 is provided on the first facing surface 20*a*, and is disposed at a position facing the seal fin 8 whose height is relatively small.

Thus, according to the present embodiment, the first step wall 22 connecting the first facing surface 20*a* facing the swirl brake fin 9 and the upstream side surface 20*b* provided upstream of the first facing surface 20*a* is provided on the outer circumferential surface 20 of the rotor 2. As a result, the flow of the working fluid that has flowed in the vicinity of the outer circumferential surface 20 of the rotor 2 on the upstream side surface 20*b* can be diverted radially outward by the first step wall 22. Therefore, the working fluid that has flowed in the vicinity of the outer circumferential surface 20 of the rotor 2 can be away from the outer circumferential surface 20 of the rotor 2. That is, it is possible to reduce the flow rate of the working fluid passing through the minute gap between the swirl brake fin 9 and the outer circumferential surface 20 (first facing surface 20*a*) of the rotor 2. For this reason, the proportion of the working fluid that collides with the positive pressure surface 91 of the swirl brake fin 9 is increased, so that the effect of reducing the circumferential velocity component by the swirl brake fin 9 can be further exhibited. As a result, unstable vibration of the rotor 2 caused by the circumferential velocity component of the working fluid flowing in the seal device 6 can be effectively suppressed.

Further, according to the present embodiment, the first step wall 22 is disposed upstream of the swirl brake fin 9. As a result, the flow of the working fluid that has been flowing in the vicinity of the outer circumferential surface 20 of the rotor 2 can be directed radially outward before the working fluid flows into the region where the swirl brake fin 9 is provided. As a result, the effect of reducing the circumferential velocity component by swirl brake fin 9 can be further exhibited.

In the above-described present embodiment, the example in which the first step wall 22 is disposed upstream of the upstream end (the left end in FIG. 6) of the swirl brake fin 9 has been described. However, the present invention is not limited to this. The first step wall 22 may be disposed at a position facing the upstream end of the swirl brake fin 9 (a position coincident with the upstream end of the swirl brake fin 9 in the axial direction X). In addition, as long as the flow of the working fluid flowing in the vicinity of the outer circumferential surface 20 of the rotor 2 can be diverted radially outward, the first step wall 22 may be disposed downstream of the upstream end of the swirl brake fin 9. In this case, the first facing surface 20*a* faces a portion of the swirl brake fin 9.

Fourth Embodiment

Next, a seal device and a turbomachine according to a fourth embodiment will be described with reference to FIG. 7.

Figure 7:
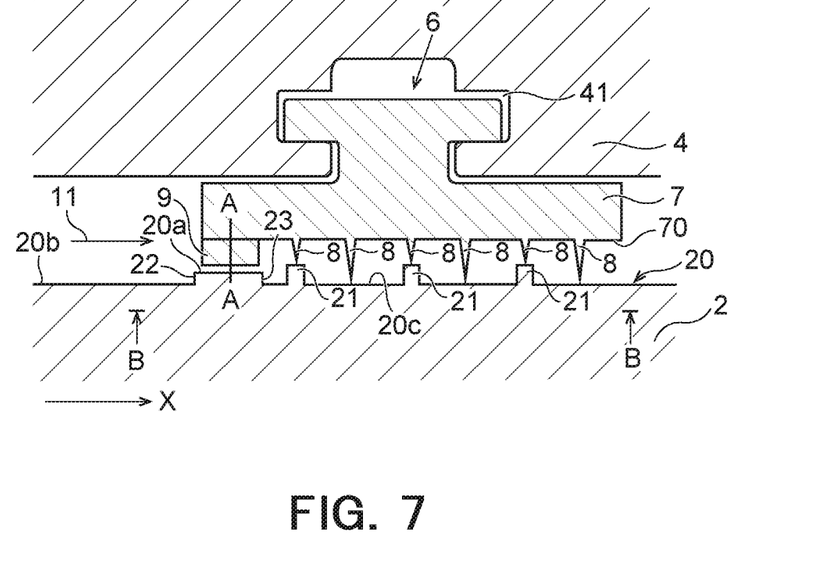
FIG. 7 is a cross-sectional view of the meridian plane showing the structure of a seal device according to a fourth embodiment.

In the fourth embodiment shown in FIG. 7, the main difference is that a first facing surface and a second facing surface facing the seal fin are connected by a second step wall, and the second facing surface has a smaller diameter than the first facing surface, and the other configurations are substantially the same as those of the third embodiment shown in FIG. 6. In FIG. 7, the same parts as those of the third embodiment shown in FIG. 6 are designated by the same reference numerals and their detailed description will be omitted.

As shown in FIG. 7, the seal device 6 according to the present embodiment further has a second facing surface 20c provided on the outer circumferential surface 20 of the rotor 2 and facing the seal fin 8. The second facing surface 20c has a diameter smaller than a diameter of the first facing surface 20a. The diameter of the second facing surface 20c may be the same as the diameter of the upstream side surface 20b. A second step wall 23 is provided downstream of the first facing surface 20a and upstream of the seal fin 8. In the example shown in FIG. 7, the second step wall 23 is disposed downstream of the downstream end (right end in FIG. 7) of the swirl brake fin 9. The first facing surface 20a and the second facing surface 20c are connected by the second step wall 23. In addition, the projection portion 21 described in FIG. 2 is provided on the second facing surface 20c, and is disposed at a position facing the seal fin 8 whose height is relatively small. The dimension of the minute gap between the tip of each seal fin 8 and the second facing surface 20c is set in the same manner as in the third embodiment.

Thus, according to the present embodiment, the second facing surface 20c facing the seal fin 8 is provided on the outer circumferential surface 20 of the rotor 2, and the diameter of the second facing surface 20c is smaller than the diameter of the first facing surface 20a facing the swirl brake fin 9. As a result, the flow path cross-sectional area of the minute gap between the seal fin 8 and the outer circumferential surface 20 (second facing surface 20c) of the rotor 2 can be reduced. Therefore, the flow rate of the working fluid passing through the minute gap can be reduced. As a result, the flow rate of the working fluid leaking through the seal device 6 can be reduced. Further, according to the present embodiment, the diameter of the upstream side surface 20b of the rotor 2 and the diameter of the second facing surface 20c can be made identical. In this case, the rigidity of the rotor 2 can be secured while the flow rate of the working fluid leaking through the seal device 6 is reduced.

Further, according to the present embodiment, the second step wall 23 is disposed downstream of the swirl brake fin 9. This can suppress an increase in a minute gap between the tip of the swirl brake fin 9 and the outer circumferential surface 20 of the rotor 2. For this reason, the effect of reducing the circumferential velocity component by the swirl brake fin 9 can be effectively exhibited. As a result, unstable vibration of the rotor 2 caused by the circumferential velocity component of the working fluid flowing in the seal device 6 can be effectively suppressed.

In the present embodiment described above, an example has been described in which the second step wall 23 is disposed downstream of the downstream end (right end in FIG. 7) of the swirl brake fin 9. However, the present invention is not limited to this. The second step wall 23 may be disposed at a position facing the downstream end of the swirl brake fin 9 (a position coincident with the downstream end of the swirl brake fin 9 in the axial direction X). In addition, the second step wall 23 may be disposed upstream of the downstream end of the swirl brake fin 9. Furthermore, the second step wall 23 may be disposed at a position facing the seal fin 8 or may be disposed downstream of the seal fin 8.

According to the embodiment described above, the circumferential velocity component of the working fluid can be effectively reduced.

While several embodiments of the present disclosure have been described, these embodiments are presented by way of example and are not intended to limit the scope of the invention. These novel embodiments can be implemented in various other forms and various omissions, substitutions, and changes can be made without departing from the spirit of the invention. These embodiments and modifications thereof are included in the scope and gist of the invention and are included in the invention described in the claims and the equivalent scope thereof.

The invention claimed is:

1. A seal device provided in an axial flow turbine including a rotation body and a stationary body provided around the rotation body, the seal device for reducing a flow rate of a working fluid leaking from a gap between the rotation body and the stationary body, the rotation body including a rotor and moving blades implanted in the rotor, the seal device comprising:
   a seal fin provided between the rotation body and the stationary body and extending in a circumferential direction of the rotation body; and
   a plurality of swirl brake fins provided on the stationary body upstream of the seal fin, tips of the plurality of swirl brake fins opposing an outer surface of the rotor in proximity, the plurality of swirl brake fins reducing a circumferential velocity component of the working fluid,
   wherein the plurality of swirl brake fins have a negative pressure surface provided on a side of a rotation direction of the rotation body and a positive pressure surface provided on an opposite side to the negative pressure surface, and
   wherein the positive pressure surface extends in a direction opposite to the rotation direction of the rotation body from radially outward toward radially inward.

2. The seal device according to claim 1, wherein the plurality of swirl brake fins extend in an axial direction of the rotation body.

3. The seal device according to claim 1, wherein the plurality of swirl brake fins extend in a direction opposite to the rotation direction of the rotation body from upstream toward downstream.

4. The seal device according to claim 1, wherein the plurality of the swirl brake fins are arranged side by side in the circumferential direction of the rotation body.

5. The seal device according to claim 1, further comprising:
   a first facing surface provided on the rotation body and facing the plurality of swirl brake fins; and
   an upstream side surface provided on the rotation body upstream of the first facing surface,
   wherein the first facing surface has a diameter larger than a diameter of the upstream side surface, and
   wherein the first facing surface and the upstream side surface are connected by a first step wall.

6. The seal device according to claim 5, wherein the first step wall is disposed upstream of the plurality of swirl brake fins.

7. The seal device according to claim 5,
   wherein the seal fin is provided on the stationary body,
   wherein the seal device further comprises a second facing surface provided on the rotation body, the second facing surface facing the seal fin, wherein the first facing surface and the second facing surface are connected by a second step wall, and wherein the second facing surface has a diameter smaller than the diameter of the first facing surface.

8. The seal device according to claim 7, wherein the second step wall is disposed downstream of the plurality of swirl brake fins.

9. An axial flow turbine comprising:
a rotation body;
a stationary body; and
the seal device according to claim 1.

* * * * *